United States Patent
Yang et al.

(10) Patent No.: US 10,198,063 B1
(45) Date of Patent: Feb. 5, 2019

(54) AVERAGE POWER SAVING MODES AND POWER ARCHITECTURE FOR READ CHANNEL PRODUCT

(71) Applicant: Avago Technologies International Sales Pte. Limited, Singapore (SG)

(72) Inventors: Shaohua Yang, San Jose, CA (US); Kapil Gaba, San Ramon, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 120 days.

(21) Appl. No.: 14/535,050

(22) Filed: Nov. 6, 2014

(51) Int. Cl.
G06F 1/32 (2006.01)
G06F 1/26 (2006.01)
G06F 1/00 (2006.01)

(52) U.S. Cl.
CPC ............... *G06F 1/324* (2013.01); *G06F 1/26* (2013.01); *G06F 1/266* (2013.01); *G06F 1/32* (2013.01); *G06F 1/3203* (2013.01); *G06F 1/325* (2013.01); *G06F 1/3206* (2013.01); *G06F 1/3215* (2013.01); *G06F 1/3221* (2013.01); *G06F 1/3234* (2013.01); *G06F 1/3243* (2013.01); *G06F 1/3256* (2013.01); *G06F 1/3268* (2013.01); *G06F 1/3296* (2013.01); *G06F 1/3287* (2013.01)

(58) Field of Classification Search
None
See application file for complete search history.

(56) References Cited

U.S. PATENT DOCUMENTS

| | | | | |
|---|---|---|---|---|
| 5,752,011 A | * | 5/1998 | Thomas | G06F 1/206 713/501 |
| 6,576,235 B1 | * | 6/2003 | Williams | A61K 47/48215 424/94.4 |
| 6,661,590 B2 | * | 12/2003 | Cyrusian | G11B 5/012 360/32 |
| 7,552,729 B2 | * | 6/2009 | O'Mara | A61M 16/0488 128/200.26 |
| 8,018,882 B1 | * | 9/2011 | Chhabra | H04W 28/18 370/235 |
| 8,433,627 B2 | * | 4/2013 | Agee | G06Q 20/10 705/19 |

(Continued)

OTHER PUBLICATIONS

ASHRAE Technical Committee, IT Equipment Thermal Management and Controls, © 2012, American Society of Heating, Refrigerating, and Air-Conditioning Engineers, Inc., 2012, 32 pages.

*Primary Examiner* — Tanh Q Nguyen
(74) *Attorney, Agent, or Firm* — Sheridan Ross P.C.

(57) ABSTRACT

A power regulation system for a read channel of a data storage assembly includes a first voltage regulator for supplying power to the front-end decoder and a second voltage regulator for supplying power to the back-end codec. The second voltage regulator may conserve power reduce supply voltage to the back-end codec when the codec operates at a lower sampling frequency. The second voltage regulator may additionally increase supply voltage to the back-end codec in conjunction with an increase in sampling frequency. The system may additionally include a third voltage regulator for supplying a memory structure of the read channel with only the minimum required operating voltage to prevent leakage power.

20 Claims, 5 Drawing Sheets

(56) References Cited

U.S. PATENT DOCUMENTS

| | | | | |
|---|---|---|---|---|
| 8,433,937 | B1* | 4/2013 | Wheelock | G11B 19/00 |
| | | | | 713/300 |
| 8,732,495 | B2 | 5/2014 | Hsiao et al. | |
| 8,767,354 | B1* | 7/2014 | Ferris | G11B 5/40 |
| | | | | 360/272 |
| 9,329,660 | B2* | 5/2016 | Krishnamoorthy | G06F 1/3234 |
| 9,360,915 | B1* | 6/2016 | Schuttenberg | G06F 1/3203 |
| 2006/0103965 | A1* | 5/2006 | Tanner | G11B 19/02 |
| | | | | 360/69 |
| 2007/0043963 | A1* | 2/2007 | Cheng | G06F 1/3203 |
| | | | | 713/320 |
| 2008/0055760 | A1* | 3/2008 | Tiwari | G11B 5/02 |
| | | | | 360/46 |
| 2008/0228959 | A1* | 9/2008 | Wang | G06F 1/206 |
| | | | | 710/22 |
| 2011/0145605 | A1* | 6/2011 | Sur | G06F 1/206 |
| | | | | 713/300 |
| 2012/0166854 | A1* | 6/2012 | Rotem | G06F 1/28 |
| | | | | 713/340 |
| 2013/0086564 | A1* | 4/2013 | Felch | G06F 8/41 |
| | | | | 717/145 |

* cited by examiner

AVERAGE POWER SAVING MODES AND POWER ARCHITECTURE FOR READ CHANNEL PRODUCT

TECHNICAL FIELD

This disclosure relates generally to data storage systems, and more particularly to systems and methods for regulating output voltage and power consumption of components in a read channel.

BACKGROUND

Individual components of a read channel assembly connected to a hard disk drive (HDD) may be powered by a single electronic power source. Voltage regulators may be used to provide a supply voltage to individual integrated circuits (ICs) and components such as decoders, memory units, and controllers. A read channel may include multiple codecs and decoders, some operating at a fixed clock rate and others at a variable or dynamic clock rate. A back-end codec capable of variable or dynamic clock rate, then, may throttle to a lower sampling frequency (ex.—underclock) in order to control peak current or if peak performance is not required. Controlling power consumption by individual read channel components can reduce power usage by the overall system and, consequently, system operating costs. Power regulation may also prolong usage times by preventing excessive heat within the read channel assembly.

However, simply throttling down the sampling frequency of the back-end codec in the above assembly will not accomplish meaningful average power reduction. If the front-end signal processing unit (ex.—decoder) operates at a fixed clock rate, it will require a consistent power supply voltage. If the read channel assembly includes only a single voltage regulator, the voltage regulator must supply the front-end with its required voltage. Any other connected components would therefore also receive the same voltage, regardless of frequency. The average power usage P of an individual component can be shown by $$P = \alpha f C v^2$$

where $\alpha$ is the activity factor or percentage of busy circuits, and f is the operating frequency of the component. As $\alpha$ is inversely proportional to f at the operation condition, a reduction in frequency does not result in a corresponding reduction of average power. However, average power P is directly proportional to the square $v^2$ of voltage supplied to the component. It may therefore be desirable to reduce overall power usage by regulating the voltage supplied to individual read channel components.

SUMMARY

Embodiments of the present disclosure concern systems and methods for regulating power usage in a read channel of a data storage assembly having a front-end signal processing unit and a back-end codec. In embodiments, a power regulation system may include a first voltage regulator for supplying voltage to the front-end signal processing unit and a second voltage regulator for supplying voltage to the back-end codec. In embodiments, the second voltage regulator may reduce the supply voltage to the back-end codec in response to a throttling down in sampling frequency by the back-end codec. In embodiments, the second voltage regulator may increase the supply voltage to the back-end codec simultaneous with or immediately prior to an increase in sampling frequency by the back-end codec. In embodiments, any reduction in voltage supplied to the back-end codec by the second voltage regulator accounts for static or dynamic IR drop due to codec activity. In embodiments, the power regulation system may include a third voltage regulator for supplying a memory structure of the read channel with a minimum operating voltage in order to prevent memory leakage power.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The invention may be better understood by those skilled in the art by reference to the accompanying figures in which.

DETAILED DESCRIPTION

Features of the present invention in its various embodiments are exemplified by the following descriptions with reference to the accompanying drawings, which describe the present invention with further detail. These drawings depict only selected embodiments of the present invention, and should not be considered to limit its scope in any way.

Figure 1:
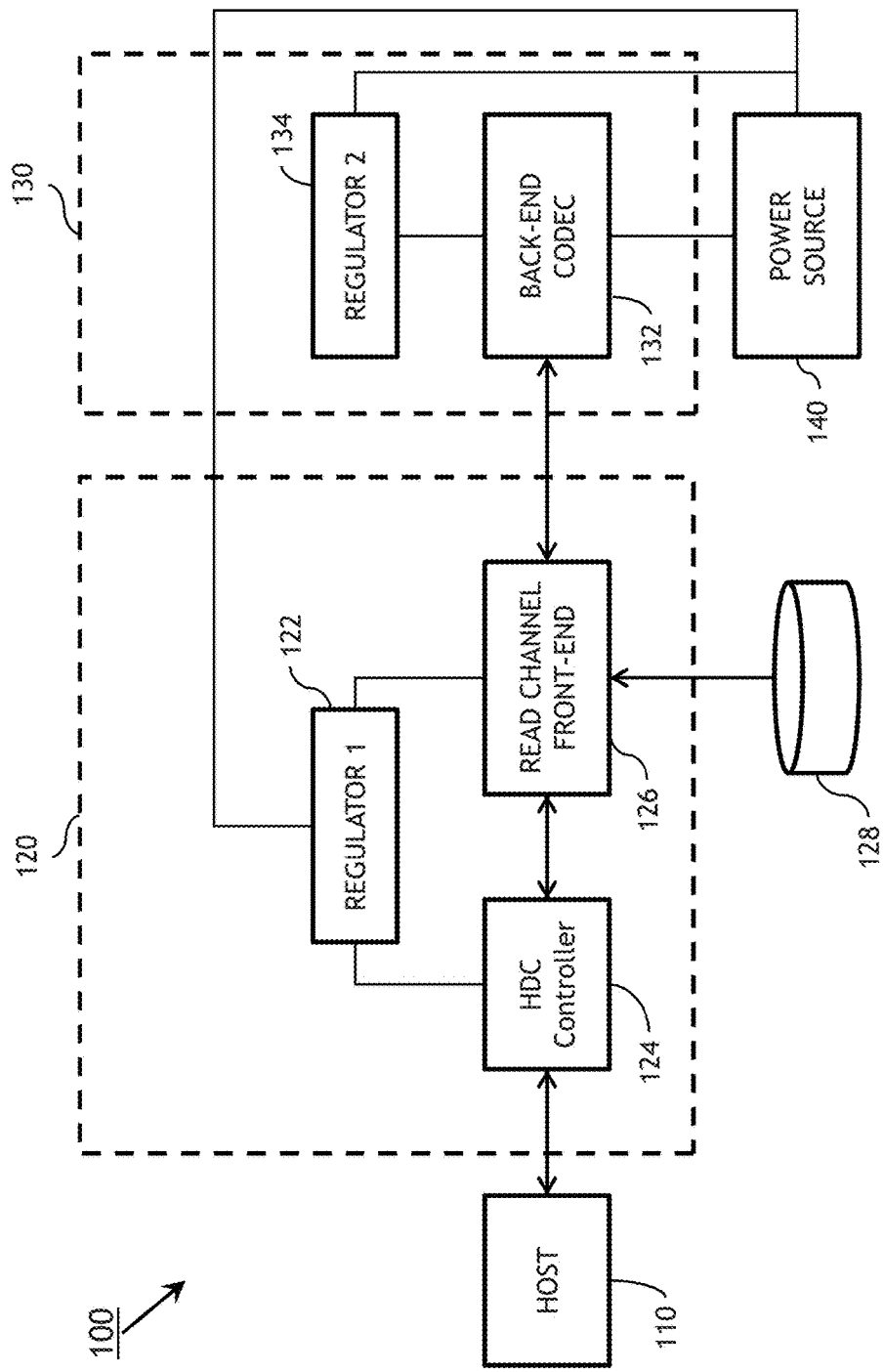
FIG. 1 is a block diagram of a read channel assembly according to embodiments of the invention.

FIG. 1 illustrates a read channel assembly 100 according to embodiments of the present invention. In embodiments, read channel assembly 100 can include host system 110, hard disk device (HDD) 128, front end components 120, back-end components 130, and power source 140. In embodiments, front-end component 120 is a signal processing unit (ex.—decoder) 126. In embodiments, a first voltage regulator 122 can supply a consistent voltage to controller 124 and front-end signal processing unit 126 (consistently sampling at frequency F). In embodiments, a second voltage regulator 134 can then independently supply voltage to back-end codec 132. In embodiments, when back-end codec 132 throttles down to a lower sampling frequency f<F, voltage regulator 134 can then reduce the back-end codec 132 supply voltage V to a lower voltage v=μV while voltage regulator 122 maintains a consistent voltage to front-end signal processing unit 126. In embodiments, a voltage reduction of 1−u can result in a significant savings of average power:

$$P_{pre} = \alpha f C v^2$$

-continued $$P_{post} = \alpha fC(\mu v)^2$$
$$= \alpha fC\mu^2 v^2$$
$$= \mu^2(\alpha fCv^2)$$

$$P_{pre} - P_{post} = (1-\mu^2)P_{pre}$$

In other words, a voltage reduction to μ=90 percent when frequency throttling (i.e., 10 percent less than prior voltage) can result in an average power savings of $(1-\mu^2)$=19 percent (i.e., to $1-(90\%)^2$=81 percent of prior average power). In some embodiments, the second voltage regulator 134 can dynamically respond to automatic frequency throttling by back-end codec 132. In other embodiments, frequency throttling and voltage reduction can be statically programmed at discrete levels (e.g., 133 percent, 120 percent, 89 percent, 71 percent of the supply voltage V provided to front-end signal processing unit 126). In some embodiments, voltage regulator 134 may be programmed to maximize efficient operation by throttling to optimal voltage levels for a particular circuit or component size. In some embodiments, back-end codec 132 may throttle to a lower frequency in response to an activity condition (i.e., all major circuits in the codec running in parallel), a temperature condition (i.e., excess heat within the read channel components) or a command input by a user.

Figure 2:
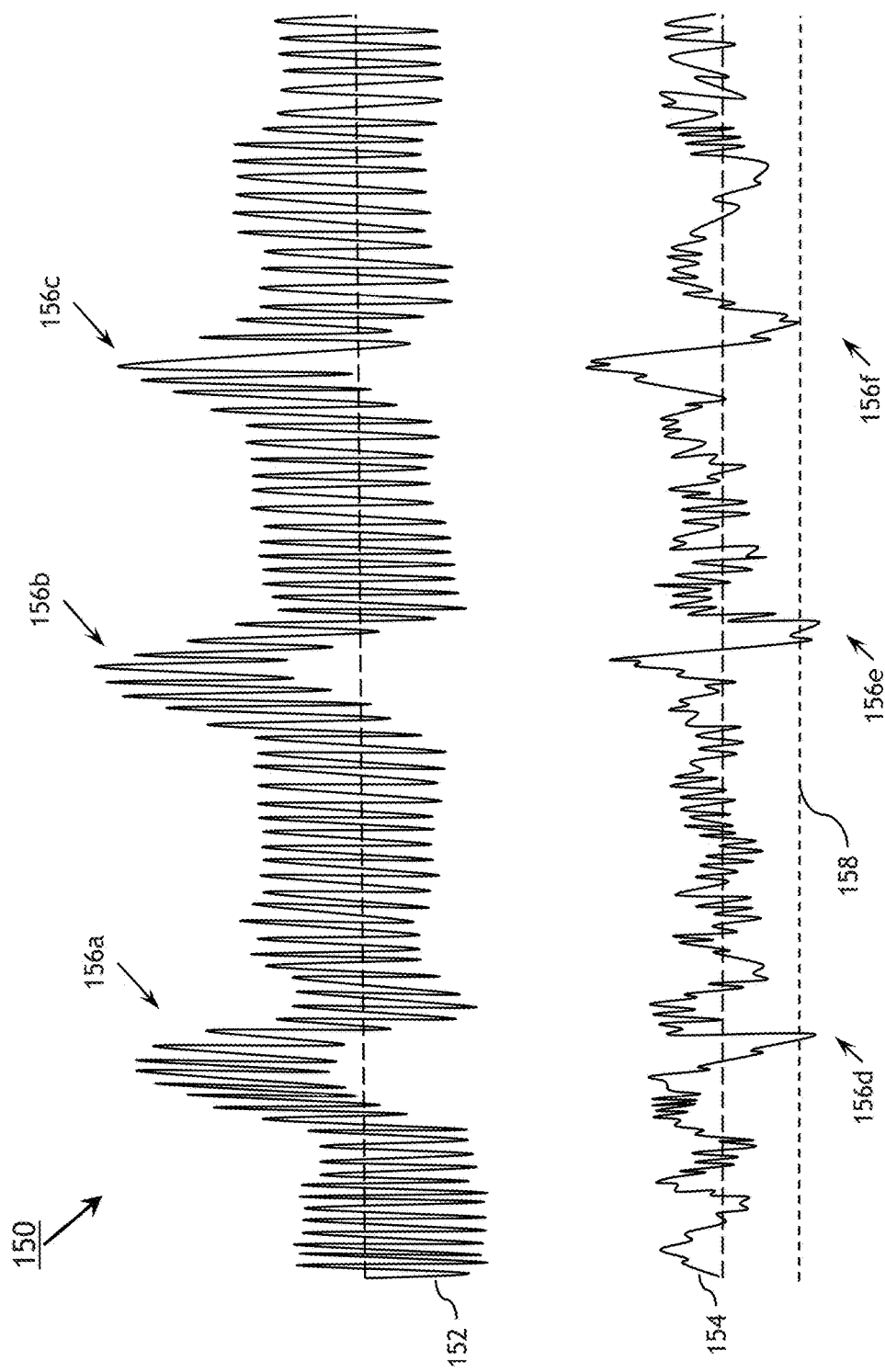
FIG. 2 is a diagrammatic illustration of power states in a read channel assembly according to embodiments of the invention.

In embodiments, the reduced voltage v supplied to back-end codec 132 remains above the minimum operating voltage for back-end codec 132 at a given sampling frequency. In embodiments, voltage regulator 134 additionally ensures any reduction of voltage supplied to back-end codec 132 takes into account static and dynamic IR drops due to codec activity. FIG. 2 depicts the relationship 150 between operating current 152 and operating voltage 154 of back-end codec 132. In embodiments, back-end codec 132 deactivates at point 156a, reactivates at point 156b, and deactivates at point 156c as shown by peaks in current 152. In embodiments, unless taken into account the resulting IR drop (156d, 156e, 156f) may lower the voltage 154 below the minimum operating voltage 158 for back-end codec 132, resulting in a timing violation.

In embodiments, voltage regulator 134 may increase supply voltage to back-end codec 132 in conjunction with an increase in sampling frequency by the back-end codec 132. In embodiments, the increase in voltage may occur simultaneously with, or immediately before, the increase in sampling frequency so as to prevent the supply voltage from falling below the minimum operating voltage associated with the increased sampling frequency (and a corresponding timing violation). In embodiments, voltage regulator 134 limits the voltage supplied to the back-end codec 132 to less than a circuit nominal design voltage particular to the back-end codec 132. In embodiments, the back-end codec 132 limits its sampling frequency to less than a circuit nominal design frequency particular to the back-end codec 132, according to the voltage supplied by voltage regulator 134. In embodiments, voltage regulator 134 maintains the voltage supplied to back-end codec 132 above the minimal voltage requirement associated with the current sampling frequency to avoid timing violations.

Figure 3:
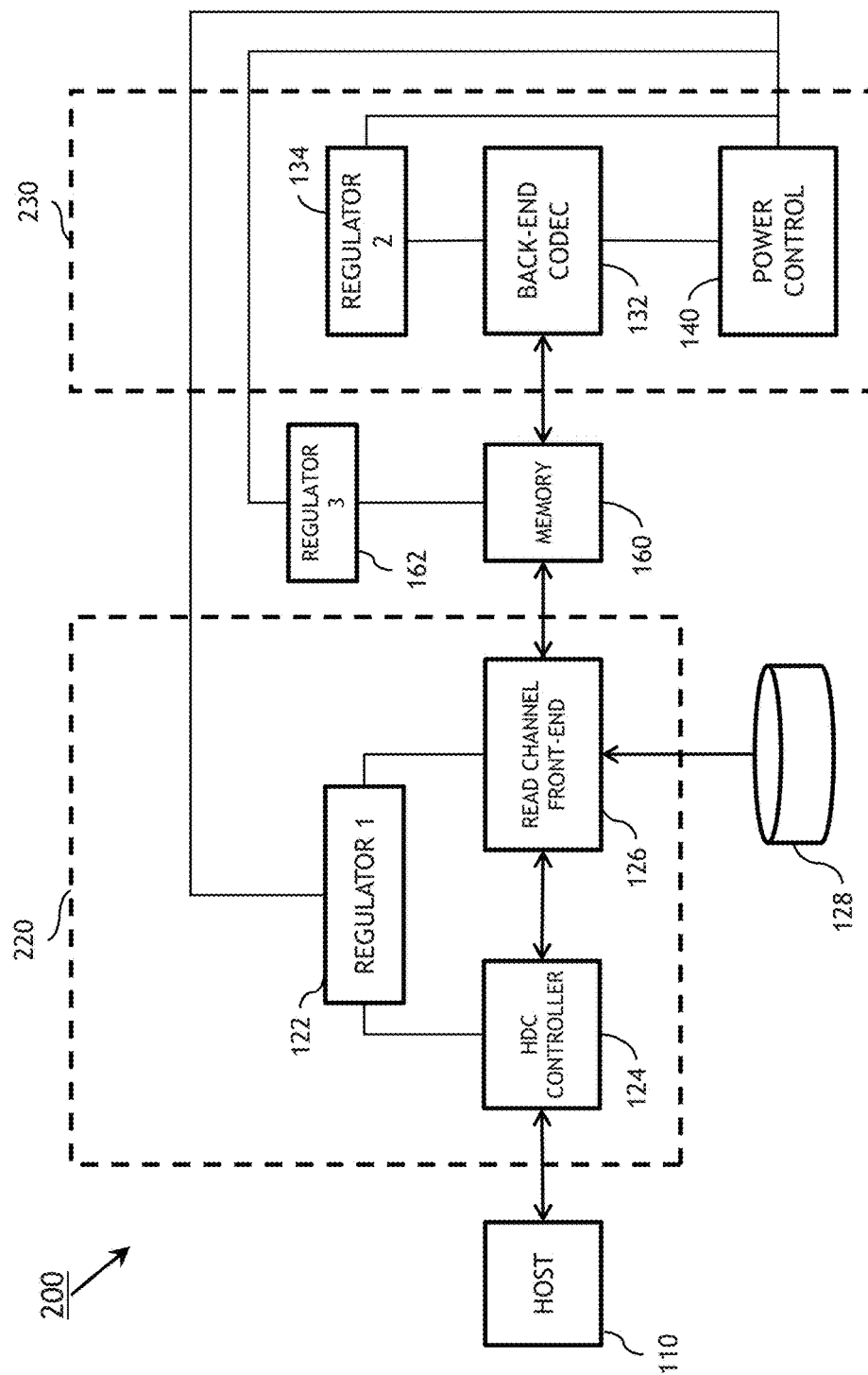
FIG. 3 is a block diagram of a read channel assembly according to embodiments of the invention.

In some embodiments, a power regulation system may further conserve power usage by regulating the voltage supply to memory structures of the read channel assembly. FIG. 3 depicts a read channel assembly 200 according to embodiments of the present invention. In embodiments, memory structure 160 may require only a minimum supply voltage to remain operational. In embodiments, a higher than necessary voltage supplied to memory structure 160 can result in a corresponding extra leakage power. In embodiments, this leakage power may be significant, especially during overdrive conditions, due to the direct relationship between leakage power and memory voltage. In some embodiments, third voltage regulator 162 supplies memory structure 160 with a dedicated minimum supply voltage, so that memory structure 160 has sufficient power to operate normally without excess leakage power dissipation. In embodiments, this dedicated minimum supply voltage is less than the voltage supplied by voltage regulator 122 to front-end signal processing unit 126.

Figure 4:
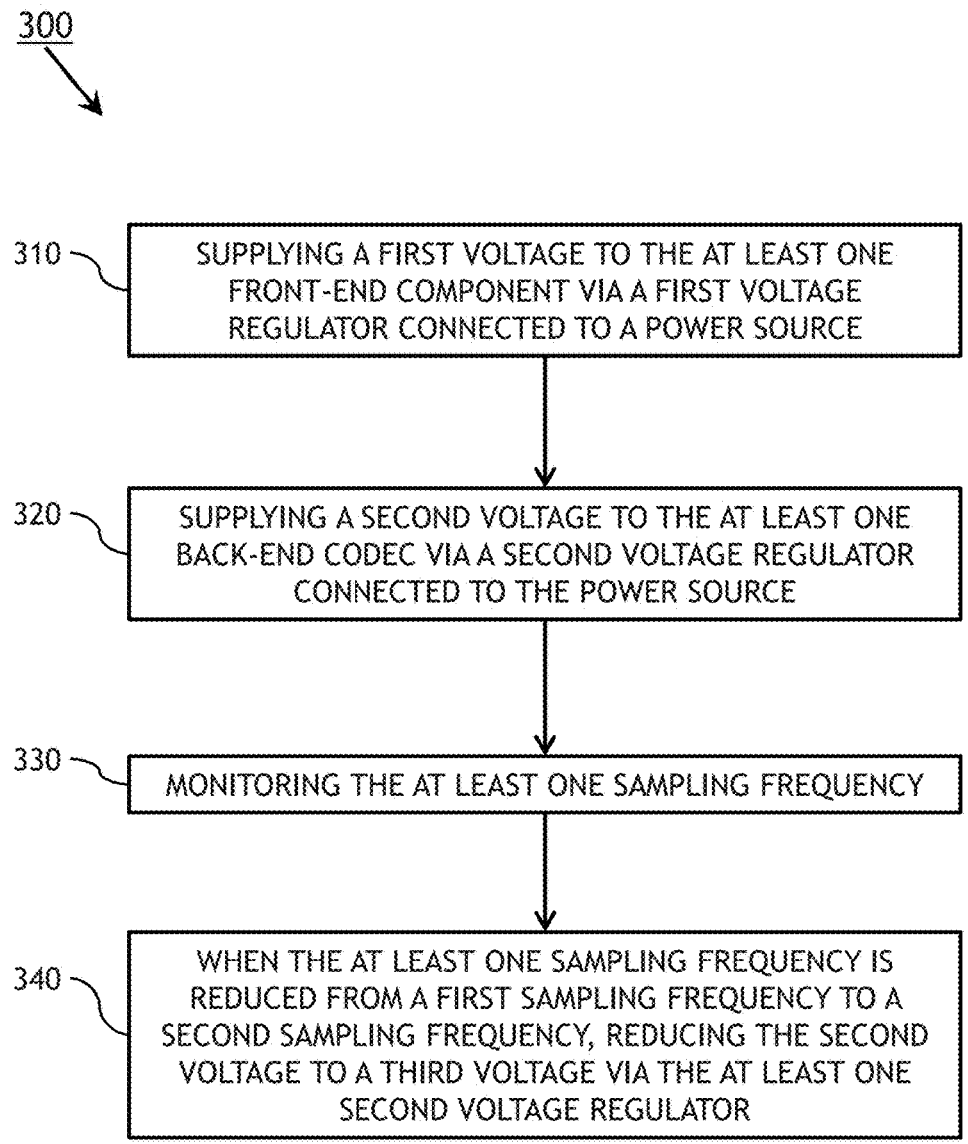
FIG. 4 is a process flow diagram of a method according to embodiments of the invention.
Figure 5:
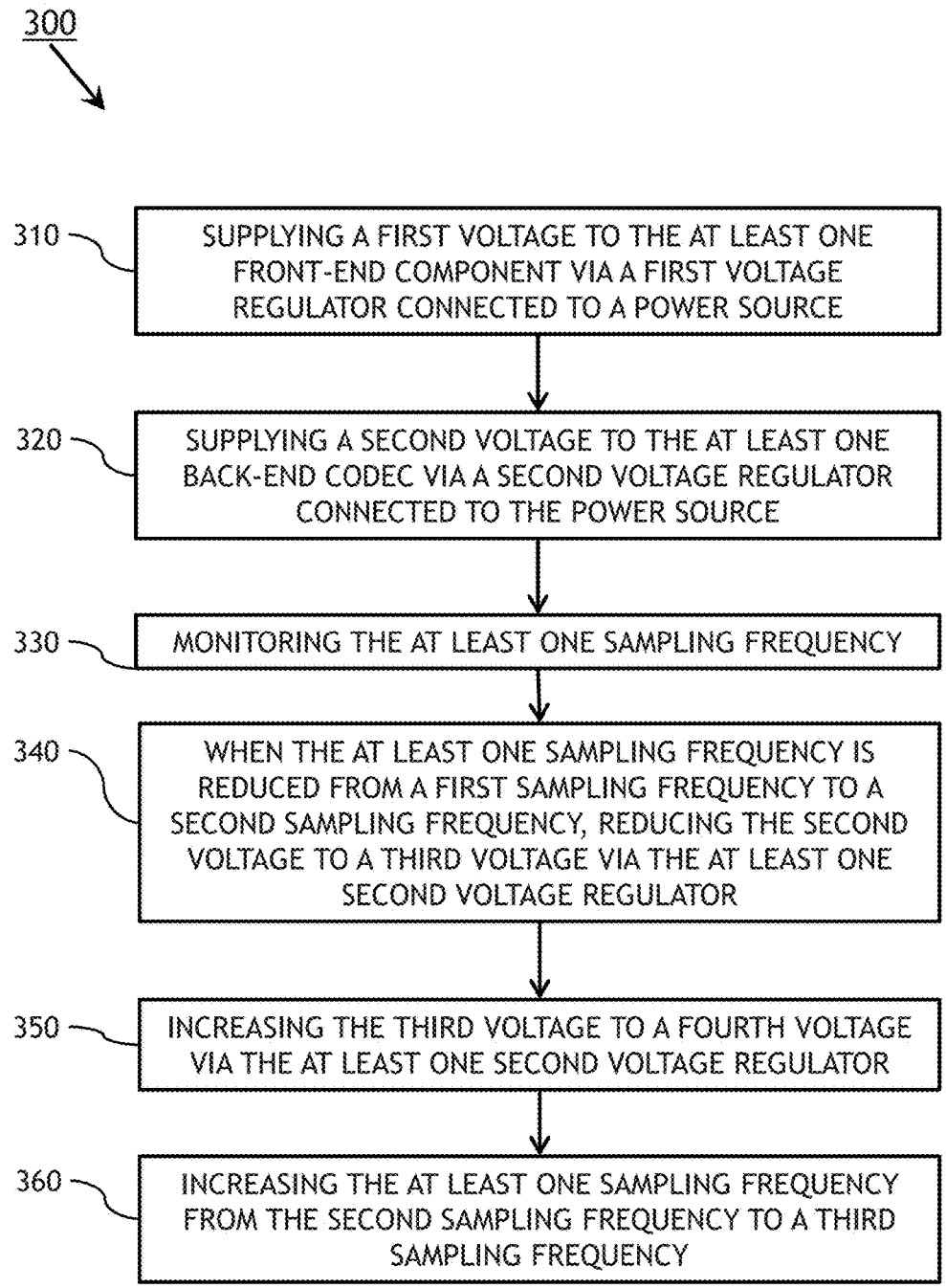
FIG. 5 is a process flow diagram of a method according to embodiments of the invention.

FIG. 4 illustrates a process flow diagram of a method 300 for dynamic power regulation in a read channel assembly 100 having at least one front-end component 126 and at least one back end codec 132, the back-end codec 132 having at least one sampling frequency, according to an embodiment of the present invention. It is noted herein that the method 200 can be carried out utilizing any of the embodiments described previously. It is further noted, however, that method 200 is not limited to the components or configurations described previously as multiple components and/or configurations can be suitable for executing method 300.

At step 310, the method 300 supplies a first voltage to the at least one front-end component 126 via a first voltage regulator 122 connected to a power source 140. At step 320, the method 300 supplies a second voltage to the at least one back-end codec 132 via a second voltage regulator 134 connected to the power source 140. At step 330, the method 300 monitors the at least one sampling frequency. At step 340, when the at least one sampling frequency is reduced from a first sampling frequency to a second sampling frequency, the method 300 reduces the second voltage to a third voltage via the at least one second voltage regulator 134.

Referring now to FIG. 4, method 300 may include additional method steps 350 and 360. At step 350, the method 300 increases the third voltage to a fourth voltage via the at least one second voltage regulator 134. At step 360, the method 300 increases the at least one sampling frequency from the second sampling frequency to a third sampling frequency. In some embodiments, the increasing of the at least one sampling frequency occurs simultaneously with or immediately following the increasing of the third voltage to the fourth voltage.

Those having skill in the art will appreciate that there are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

We claim:

1. A power regulation system for a read channel assembly, the read channel assembly having at least one front-end component and at least one back end codec having at least one sampling frequency, the system comprising:
   at least one first voltage regulator connected to a power source and to the at least one front-end component, and to use the power source to supply a first voltage to the at least one front-end component; and
   at least one second voltage regulator connected to the power source and to the at least one back-end codec, and to use the power source to (a) supply a second voltage to the at least one back-end codec, and (b) decrease from the second voltage to a third voltage lower than the second voltage in response to at least one first prompt from the at least one back-end codec,
   wherein the at least one first prompt includes the at least one back-end codec reducing the at least one sampling frequency at which a data signal is being sampled by the at least one back-end codec from a first sampling frequency to a second sampling frequency,
   wherein the reducing of the at least one sampling frequency occurs in response to an activity condition in which circuits of the at least one back-end codec are running in parallel, and
   wherein the at least one first voltage regulator holds the first voltage constant while the at least one second voltage regulator decreases from the second voltage to the third voltage.

2. The system of claim 1, wherein the reducing of the at least one sampling frequency also occurs in response to at least one of a temperature condition a user command, and a programmed command.

3. The system of claim 1, further comprising:
   at least one third voltage regulator connected to the power source and to at least one memory structure of the read channel, and to supply a fourth voltage to the at least one memory structure.

4. The system of claim 3, wherein the fourth voltage is lower than the first voltage and higher than the minimum operating voltage for the at least one memory structure.

5. The system of claim 1, wherein the at least one second voltage regulator increases from the third voltage to a fourth voltage higher than the third voltage in response to a second prompt from the at least one back-end codec.

6. The system of claim 5, wherein the at least one back-end codec increases from the second sampling frequency to a third sampling frequency higher than the second sampling frequency in response to the increasing to the fourth voltage.

7. The system of claim 5, wherein the at least one second voltage regulator is configured to limit at least one of the second voltage, the third voltage, and the fourth voltage to less than a circuit nominal design voltage and greater than the minimal voltage requirement associated with the at least one sampling frequency.

8. The system of claim 1, wherein the at least one back-end codec limits the at least one sampling frequency to less than a circuit nominal design frequency according to the minimum voltage requirement associated with the at least one sampling frequency.

9. The system of claim 1, wherein the at least one front-end component includes a signal processing unit.

10. A method for dynamic power regulation in a read channel assembly, the read channel assembly having at least one front-end component and at least one back end codec having at least one sampling frequency, the method comprising:
    supplying a first voltage to the at least one front-end component via a first voltage regulator powered by a power source;
    supplying a second voltage to the at least one back-end codec via a second voltage regulator powered by the power source;
    monitoring the at least one sampling frequency; and
    when the at least one sampling frequency at which a data signal is being sampled by the at least one back-end codec is reduced from a first sampling frequency to a second sampling frequency, reducing the second voltage to a third voltage via the at least one second voltage regulator,
    wherein the first voltage regulator holds the first voltage constant while the second voltage regulator reduces the second voltage to the third voltage, and
    wherein the reducing of the at least one sampling frequency occurs in response to an activity condition in which circuits of the at least one back end codec are running in parallel.

11. The method of claim 10, further comprising:
    increasing the third voltage to a fourth voltage via the at least one second voltage regulator; and
    increasing the at least one sampling frequency from the second sampling frequency to a third sampling frequency.

12. The method of claim 11, wherein the increasing of the at least one sampling frequency occurs simultaneously with or immediately following the increasing of the third voltage to the fourth voltage.

13. A data storage assembly, comprising:
a power source;
a read channel including at least one front-end component;
at least one first voltage regulator connected to the power source and to the at least one front-end component, and to use the power source to supply a first voltage to the at least one front-end component;
at least one back-end codec connected to the read channel and having at least one sampling frequency; and
at least one second voltage regulator connected to the power source and to the at least one back-end codec, and to use the power source to (a) supply a second voltage to the at least one back-end codec and (b) decrease from the second voltage to a third voltage lower than the second voltage in response to at least one first prompt from the at least one back-end codec,
wherein the at least one first prompt includes the at least one back-end codec reducing the at least one sampling frequency at which a data signal is being sampled by the at least one back-end codec from a first sampling frequency to a second sampling frequency,
wherein the at least one first voltage regulator holds the first voltage constant while the at least one second voltage regulator decreases from the second voltage to the third voltage,
wherein the at least one second voltage regulator accounts for voltage drops caused by activation or deactivation of the at least one back-end codec such that i) the second voltage remains above a first minimum operating voltage associated with the first sampling frequency, and ii) the third voltage remains above a second minimum operating voltage associated with the second sampling frequency, and
wherein the first minimum operating voltage is different than the second minimum operating voltage.

14. The assembly of claim 13, wherein the reduction occurs in response to an activity condition in which circuits in the at least one back-end coded are running in parallel.

15. The assembly of claim 13, further comprising:
at least one memory structure connected to the read channel and to the at least one back-end codec; and
at least one third voltage regulator connected to the at least one memory structure and to supply to the at least one memory structure a fourth voltage less than the first voltage and higher than the minimum operating voltage for the at least one memory structure.

16. The assembly of claim 13, wherein the at least one second voltage regulator increases the third voltage to a fourth voltage in response to a second prompt from the at least one back-end codec.

17. The assembly of claim 16, wherein the at least one back-end codec increases the second sampling frequency to a third sampling frequency in response to the increasing of the third voltage to the fourth voltage.

18. The assembly of claim 13, wherein the at least one front-end component includes a signal processing unit.

19. The system of claim 1, wherein the second voltage regulator accounts for voltage drops caused by activation or deactivation of the at least one back-end codec such that i) the second voltage remains above a first minimum operating voltage associated with the first sampling frequency, and ii) the third voltage remains above a second minimum operating voltage associated with the second sampling frequency.

20. The system of claim 19, wherein the first minimum operating voltage is different than the second minimum operating voltage.

* * * * *